(12) United States Patent
Davis

(10) Patent No.: US 7,459,088 B2
(45) Date of Patent: Dec. 2, 2008

(54) WATER DESALINATION PROCESS AND APPARATUS

(75) Inventor: Thomas A. Davis, Columbia, SC (US)

(73) Assignee: The University of South Carolina, Columbia, SC (US)

(*) Notice: Subject to any disclaimer, the term of this patent is extended or adjusted under 35 U.S.C. 154(b) by 376 days.

(21) Appl. No.: 11/225,852

(22) Filed: Sep. 13, 2005

(65) Prior Publication Data

US 2006/0060532 A1   Mar. 23, 2006

Related U.S. Application Data

(60) Provisional application No. 60/609,404, filed on Sep. 13, 2004, provisional application No. 60/651,819, filed on Feb. 10, 2005, provisional application No. 60/664,223, filed on Mar. 22, 2005, provisional application No. 60/683,936, filed on May 23, 2005.

(51) Int. Cl.
*B01D 61/44* (2006.01)
*B01D 61/42* (2006.01)
*B01D 61/02* (2006.01)
*B01D 61/46* (2006.01)

(52) U.S. Cl. ............... 210/702; 210/652; 210/748; 204/523; 204/532; 204/522

(58) Field of Classification Search .............. None
See application file for complete search history.

(56) References Cited

U.S. PATENT DOCUMENTS

| | | | |
|---|---|---|---|
| 3,372,101 A | 3/1968 | Kollsman | |
| 3,933,610 A | 1/1976 | Ehara et al. | |
| 4,036,749 A | 7/1977 | Anderson | |
| 4,083,781 A | 4/1978 | Conger | |
| 4,141,825 A | 2/1979 | Conger | |

(Continued)

FOREIGN PATENT DOCUMENTS

GB    759275 A2    10/1956

OTHER PUBLICATIONS

Search Report and Written Opinion for PCT/US05/32419, Aug. 15, 2006.

(Continued)

*Primary Examiner*—Krishnan S Menon
(74) *Attorney, Agent, or Firm*—Dority & Manning, P.A.

(57) ABSTRACT

A process and system for purifying water is disclosed. For example, in one embodiment, the process may be used to remove a divalent salt, such as calcium sulfate, from a water source in order to prevent the divalent salt from precipitating during the process. The water source, for instance, may be fed to an ion separating device, such as an electrodialysis device. In the electrodialysis device, an ion exchange takes place between the divalent salt and another salt, such as a monovalent salt to produce two concentrated salt streams that contain salts having greater solubility in water than the divalent salt. In one embodiment, the two salt streams that are produced may then be combined to precipitate the divalent salt in a controlled manner. During the process, various other components contained within the water feed stream may also be removed from the stream and converted into useful products. In one particular embodiment, the process is configured to receive a byproduct stream from a reverse osmosis process.

72 Claims, 6 Drawing Sheets

U.S. PATENT DOCUMENTS

| | | | |
|---|---|---|---|
| 4,808,287 | A | 2/1989 | Hark |
| 4,999,095 | A | 3/1991 | Chlanda et al. |
| 5,064,505 | A | 11/1991 | Borgren |
| 5,124,012 | A | 6/1992 | Berleyev |
| 5,238,574 | A | 8/1993 | Kawashima et al. |
| 5,284,589 | A | 2/1994 | Tegtmeyer et al. |
| 5,376,250 | A | 12/1994 | Hamano |
| 5,385,650 | A | 1/1995 | Howarth et al. |
| 5,458,781 | A | 10/1995 | Lin |
| 5,510,394 | A | 4/1996 | Hodgdon |
| 5,587,083 | A | 12/1996 | Twardowski |
| 5,626,904 | A | 5/1997 | Frederiksen |
| 5,928,853 | A | 7/1999 | Yamamoto |
| 6,030,535 | A | 2/2000 | Hayashi et al. |
| 6,187,201 | B1 | 2/2001 | Abe et al. |
| 6,391,205 | B1 | 5/2002 | McGinnis |
| 6,508,936 | B1 | 1/2003 | Hassan |
| 6,712,946 | B2 * | 3/2004 | Genders et al. ............. 204/518 |
| 6,814,865 | B1 | 11/2004 | Aminabhavi et al. |
| 2001/0040093 | A1 * | 11/2001 | Mani .......................... 204/522 |
| 2002/0005356 | A1 * | 1/2002 | Mazur et al. ................ 204/537 |
| 2002/0166758 | A1 | 11/2002 | Vinz |
| 2004/0055955 | A1 | 3/2004 | Davis |

OTHER PUBLICATIONS

English Abstract of JP07047365 dated Feb. 21, 1995, European Patent Office.
English Abstract of JP09276864 dated Oct. 28, 1997, European Patent Office.
English Abstract of JP2001259644 dated Aug. 25, 2001, European Patent Office.
English Abstract of JP2001259376 dated Aug. 25, 2001, European Patent Office.
*Article-* Al-Sofi. "Seawater Desalination- SWCC Experience and Vision." *Desalination.* vol. 135, 2001: 121-139.
*Article-* Pontie et al. "Seawater Nanofiltration: Fiction or Reality." *Desalination.* vol. 158, 2003:277-280.
*Article-* Wen et al. Modeling the Cross Flow Spirally Wound Electrodialysis (SpED) Process. *Desalination.* vol. 103, 1995:165-176.
*Article-* Wen et al. "Spirally Wound Electrodialysis (SpED) Modules." *Desalination.* vol. 101, 1995:79-91.
*Article-* Tanka et al. "Ion-exchange Membrane Electrodialystic Salt Production Using Brine Discharged from Reverse Osmosis Seawater Desalination Plant." *Journal of Membrane Science.* vol. 222, 2003:71-86.
Lacey et al. "Industrial Processing with Membranes." Wiley-Interscience. Aug. 1972:83-106.
Published report by Atsushi Tomita based on the lecture titled "Salt & Chlor-Alkali Plant in Kuwait by All-membrane Process" given at the 33rd Electrodialysis Symposium held on Nov. 10, 1987.
Product Specification sheet for Filmtec Membranes published May 2002.
Book published by Wiley-Interscience. Aug. 1972; pp. 83-106 by Robert E. Lacey et al. entitled Industrial Processing with Materials.

* cited by examiner

WATER DESALINATION PROCESS AND APPARATUS

RELATED APPLICATIONS

The present application is based upon and claims priority to U.S. Provisional Patent Application No. 60/609,404, filed on Sep. 13, 2004; U.S. Provisional Patent Application No. 60/651,819, filed on Feb. 10, 2005; U.S. Provisional Patent Application No. 60/664,223, filed on Mar. 22, 2005; and U.S. Provisional Patent Application No. 60/683,936, filed on May 23, 2005.

BACKGROUND OF THE INVENTION

As population grows, the strain on the world's fresh water supplies will increase. Factors such as a pleasant climate and mineral resources, job growth and rising incomes contribute to population growth. By 2025, about 2.7 billion people, nearly one-third of the projected population, will live in regions facing severe water scarcity. Many prosperous and fast growing regions—the American Southwest, Florida, Asia, the Middle East—have inadequate freshwater supplies. The water needs of municipalities, industry, and citizens must be met, even as the difficulty and cost of developing new water resources increases.

Desalination has become a more popular option in regions where there is abundant water that is unsuitable for use due to high salinity, and there are opportunities for desalination plants that utilize thermal, electrical or mechanical energy to separate the water from the salts. The choice of the desalination process depends on many factors including salinity levels in the raw water, quantities of water needed, and the form of available energy.

Reverse osmosis is generally accepted as the most economical and energy-efficient method for desalination of highly saline water. Modern reverse osmosis membranes have such high salt rejection that they are capable of producing potable water, <500 ppm salinity, from seawater (nominally 35,000 ppm salinity) in a single pass through the membrane. Furthermore, some modern reverse osmosis systems are capable of achieving up to 50% recovery of fresh water from seawater. With 50% recovery, the salinity of the concentrated brine increases to about 70,000 ppm. Disposal of such brines presents significant costs and challenges for the desalination industry, which result in longer start-up lead times and higher cost of water. Brine disposal to surface waters in the United States requires waste water permits that prevent construction in certain high-demand areas. There are three basic ways to deal with brines from seawater desalination—discharge to the sea, deep well injection, and zero liquid discharge systems. The discharge of brines back into the sea can affect the organisms in the discharge area.

Evaporation and electrodialysis, which are proven processes for seawater desalination, can make a brine of considerably higher concentration than can be recovered from reverse osmosis, but these processes consume more energy than reverse osmosis in seawater desalination.

One problem that is of concern in many desalination processes is the formation of an unwanted precipitate, such as calcium sulfate scale. Calcium sulfate is typically present in saline water and has a relatively low solubility in water. Thus, calcium sulfate is known to precipitate in reverse osmosis processes causing various problems. For example, in evaporation processes, the high temperature at the heat exchange surfaces causes local supersaturation due to reduced solubility of calcium sulfate at elevated temperatures, even when the bulk solution is not saturated. In processes utilizing reverse osmosis and nanofiltration (NF), conditions of supersaturation can exist at the membrane surface due to buildup of ion concentrations in the boundary layer. Brackish groundwater often has enough calcium and sulfate ions to limit the amount of fresh water that can be recovered by desalination.

Disposal of the concentrated brine from reverse osmosis plants is also a major concern. The presence of dissolved salts adds to the density of water. The specific gravity (at 20° C.) of seawater (3.5% salts) is about 1.0263, and the specific gravity of high-yield reverse osmosis reject (7.0% salts) is about 1.0528. If this dense reverse osmosis reject were to be injected directly into the sea, it may accumulate at the bottom with a possible adverse effect on bottom-dwelling organisms.

Other than return to the sea, the alternatives for disposal of brines from desalination plants are limited. Evaporation ponds are generally undesirable and expensive due to the cost of land. Moreover, they are useful only in climates where evaporation rates exceed rainfall. Deep well disposal is often used for hazardous wastes, and it has been used for desalination brines in Florida, but capital costs make the process prohibitive. Furthermore, the applicability of deep well injection for large desalination plants is questionable because of the sheer volume of the brine.

In some applications, brines from desalination plants may also contain various pollutants that should not be discharged, even in small concentrations. For example, arsenic, selenium, and the like are sometimes present in seawater, groundwater or surface water. Concentrations of even a few parts per million of selenium or arsenic, for instance, may be considered hazardous. For example, agricultural operations in the Central Valley of California have a significant problem of selenium in the drainage waters that prevent reuse of the water for irrigation or for other purposes. Thus, the above pollutants can also create limitations in the use of reverse osmosis processes.

Seawater has many valuable constituents, but their value can only be realized if they can be recovered economically. There are ways to recover many of these valuable seawater constituents, but the economics of the recovery are often dismal because of the low concentrations of those constituents, and due to interference by other constituents of seawater.

One valuable component of seawater is sodium chloride (NaCl). Japan, for example, has no natural salt deposits, and land is too expensive there to allow the use of evaporation ponds for salt manufacture. For several decades Japan has relied on electrodialysis to recover table salt from seawater. The seawater is filtered and pumped at low velocity in a single pass through the desalting compartments of very large electrodialysis stacks. The voltage applied across membranes and solution compartments forces $Na^+$ ions through the cation permeable membrane on one side of the compartment and $Cl^-$ ions through the anion permeable membrane on the other side of the compartment. The $Mg^{++}$ ions, second most abundant cations in seawater, also migrate in the electric field, but $Mg^{++}$ passage through the cation permeable membrane is hindered by a special coating on the membrane surface. The passage of $SO_4^=$ ions is hindered by a coating on the anion permeable membrane. Thus the purity of the NaCl in the brine recovered by electrodialysis is substantially higher than the purity of brine prepared by evaporation of raw seawater. After concentration to 20% by electrodialysis, the brine is evaporated to dryness with the byproduct heat from the power plant used to generate the electricity for the electrodialysis.

Seawater is also used as the feedstock for the production of magnesium and bromine compounds. A commercial method for recovering $Mg^{++}$ is to add a base (usually lime) to seawater in order to precipitate $Mg(OH)_2$. One disadvantage that the recovery of magnesium from seawater has in comparison with magnesium recovery from magnesite is the low concentration of magnesium in the seawater. If the magnesium content of the brine feed could be increased at a reasonable cost, the production costs for magnesium would be reduced. Accordingly, this would allow manufacturers using seawater as a feedstock to compete more effectively with magnesium producers who use magnesite. Moreover, this would help alleviate the environmental damage associated with magnesite mining operations as well as the generation of the large amount of carbon dioxide incident to the processing of magnesite.

In view of the above, a need currently exists for processes and systems that can efficiently recover purified water from saline water. In particular, a need exists for a process and system that is capable of handling brines from reverse osmosis processes in a manner so that the brine can be discharged safely or in a manner such that there is zero liquid discharge. A need also exists for a process and system for recovering valuable chemicals, such as sodium chloride, magnesium, bromine and the like from saline water. A need further exists for a process and system for removing pollutants from saline water and possibly converting the pollutants into usable resources.

SUMMARY OF THE INVENTION

In general, the present disclosure is directed to a process and system for purifying water. The process and system of the present invention may be used to remove salts and other constituents from saline water so that the water can be used, for instance, for human or animal consumption or for irrigation. In various embodiments, the process and system of the present disclosure may also be used to not only remove constituents from saline water, but also to recover those constituents in a usable form.

In one particular embodiment, for instance, the present disclosure is directed to a process for purifying water by removing a low soluble salt, MY, from a water stream to prevent the low soluble salt from precipitating within the water stream. The process includes the steps of feeding a salt solution containing a dissolved salt, NX, to an ion separating device for forming a first salt stream containing an anion, X, and a second salt stream containing a cation, N. The ion separating device can comprise, for instance, an electrodialysis stack that includes membranes designed to separate the cations from the anions.

The water stream containing the low soluble salt, MY, is also fed to the ion separating device for adding the cation, M, to the first salt stream and for adding the anion, Y, to the second salt stream. Thus, the anion and the cation that comprise the low soluble salt are separated into different streams. Through the process, a first salt stream is created that contains a dissolved salt, MX, and a second salt stream is created containing the dissolved salt, NY. In accordance with the present disclosure, the salts NY and MX are selected so as to be more soluble in water than the salt MY. In this manner, a greater concentration of salts can be present in the first and second salt streams without reaching conditions of saturation.

In various embodiments, the cation, N, can comprise, for instance, lithium, sodium, potassium, cesium, rubidium, ammonium, an amine, or the like. The anion, X, on the other hand, may comprise chloride, bromide, iodide, nitrate, or an organic ion.

In one particular embodiment, the low soluble salt, MY, may comprise calcium sulfate. The salt, NX, may comprise sodium chloride. When the starting materials include calcium sulfate and sodium chloride, the resulting first salt stream contains calcium chloride, while the resulting second salt stream contains sodium sulfate. Both sodium sulfate and calcium chloride are much more soluble in water than calcium sulfate.

If desired, the first salt stream and the second salt stream may be fed to a precipitation chamber for precipitating and collecting the low soluble salt, MY. The supernatant collected from the precipitation chamber may contain the dissolved salt, NX, which may then be recycled and used as a feed stream in the process.

In various embodiments, the supernatant collected from the precipitation chamber may contain further cations that can be removed and formed into useful products. For example, in one embodiment, the supernatant may contain unprecipitated cations, M. In one embodiment, the unprecipitated cations, M, may be combined with a carbonate to form a carbonate salt that is precipitated and removed. For instance, if M comprises calcium, calcium carbonate may be formed and used as desired. Calcium carbonate, for instance, has many uses, including being used as a filler in various paper products.

In an alternative embodiment, the supernatant collected from the precipitation chamber may contain a cation selected from the group including magnesium, cobalt, copper and like cations that have soluble sulfate salts. These cations may be present in the initial feedwater. According to the present disclosure, the supernatant may be fed to a crystallization chamber and/or a precipitation chamber for precipitating or crystallizing any of the above cations as a salt. For instance, magnesium may be formed into magnesium sulfate, magnesium chloride, or magnesium hydroxide and collected. Selenate and/or arsenate, on the other hand, may be removed by precipitation when combined with a salt, such as barium chloride, in order to precipitate barium selenate. Arsenate may be combined with a salt, such as zinc chloride, in order to precipitate zinc arsenate.

Other features and aspects of the present disclosure are discussed in greater detail below.

BRIEF DESCRIPTION OF THE DRAWINGS

A full and enabling disclosure of the present invention, is set forth more particularly in the remainder of the specification, including reference to the accompanying figures, in which.

Figure 1:
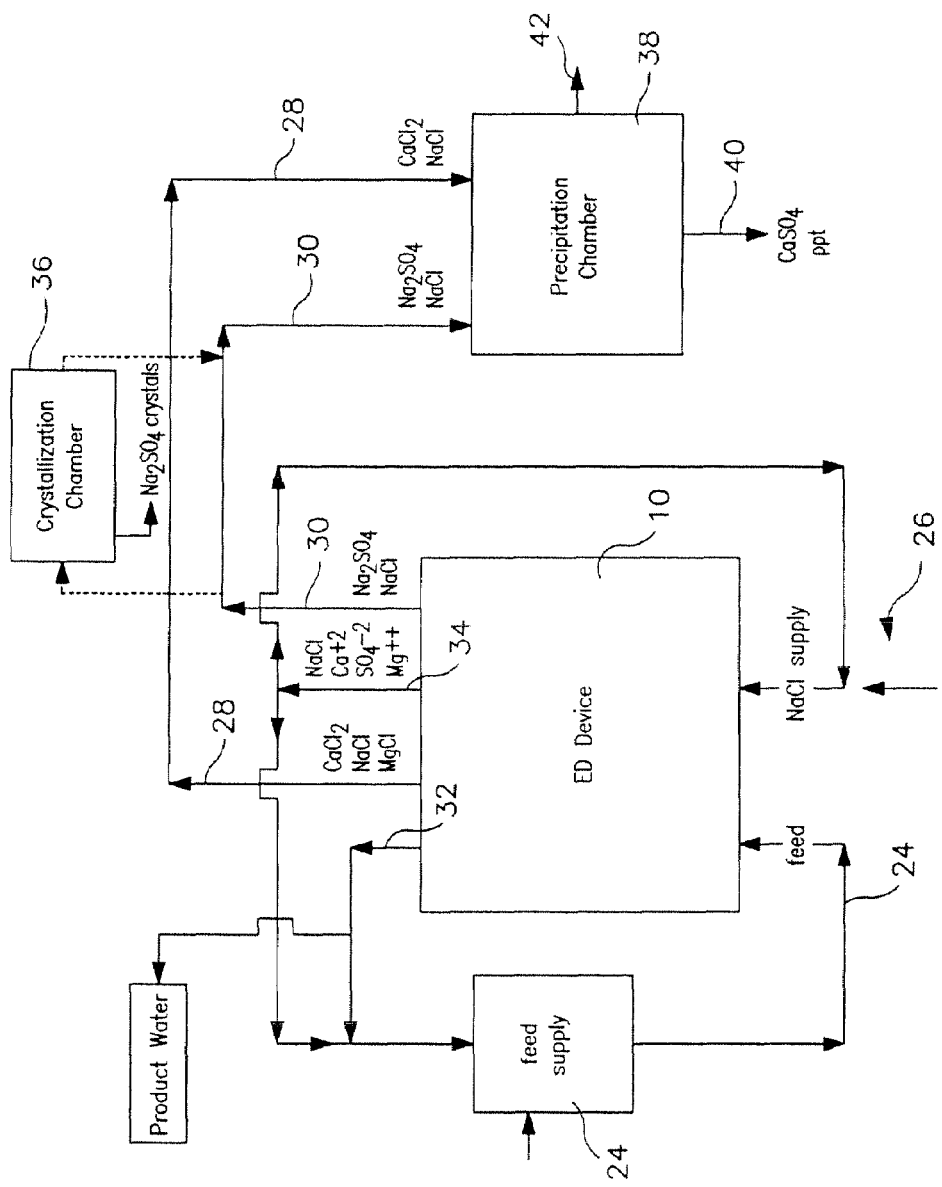
FIG. 1 is a plan view of one embodiment of a water purification process in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a process for purifying water and/or to a process for removing dissolved components from a water source for converting the components into usable products.

In one embodiment, for instance, the present disclosure is directed to a method for removing a relatively low soluble salt from water. As will be described in greater detail below, in addition to removing low soluble salts from water, the process of the present disclosure can also be used to recover dissolved components contained in a water source. For instance, the process may be used to recover dissolved magnesium, selenium, arsenic, and the like in the form of useful precipitated or crystallized salts.

With increasing population, currently a need exists for improved desalination processes for converting saline water into potable water that may be used for human consumption, animal consumption, irrigation, or for other purposes. One problem that is frequently encountered in desalination processes, however, is the ability to process brackish waters that contain relatively low soluble salts, such as divalent salts. For example, many brackish waters from inland water supplies contain divalent salts such as calcium sulfate in larger concentrations than monovalent salts such as sodium chloride. As an example, groundwater in the Tularosa basin of New Mexico is characterized by a high concentration of calcium sulfate. During desalination processes, the divalent salts, such as calcium sulfate, have a tendency to increase in concentration causing the divalent salt to precipitate in the concentrating stream of the process. Once formed, the precipitate causes various problems. For instance, the precipitate can foul process equipment and can also cause deterioration in the performance of the process.

One aspect of the present disclosure is directed to a process for removing divalent salts, such as calcium sulfate, from a saline feed water without causing any unwanted precipitation of the divalent salt. For exemplary purposes only, the following description will discuss removing the divalent salt, calcium sulfate, from a feed water. It should be understood, however, that the principles of the present disclosure may be applied to any suitable salt. Other salts that may be processed in accordance with the present disclosure include for instance, barium sulfate and strontium sulfate.

In order to remove the divalent salt from the feed water, the feed water is fed to an ion separating device that transfers the anions and the cations of the feed water into separate solutions. In particular, at least a portion of the cations contained in the feed water are separated from the water source and transferred into a first salt stream. Likewise, at least a portion of the anions contained in the feed water are separated from the feed water and fed into a second salt stream. The desalinated feed water may then be used as desired or fed into further purification processes.

In accordance with the present disclosure, a second salt, such as a monovalent salt, is also fed to the ion separating device. The cations from the second salt are fed to the second salt stream, while the anion from the second salt is fed to the first salt stream. Thus, the two salts entering the ion separating device change partner ions to form two different salts.

For example, if calcium sulfate is contained in the feed water and the second salt comprises a monovalent salt such as sodium chloride, the first salt stream produced in the process contains calcium chloride, while the second salt stream contains sodium sulfate. Thus, in summary, two salts, calcium sulfate and sodium chloride, in two separate diluate streams change partners to form sodium sulfate and calcium chloride in two separate concentrate streams.

The ion separating device used to separately remove the cations and the anions may vary depending upon the particular application. For example, an electrodialysis stack containing ion-exchange membranes may be used. One particular embodiment utilizes an electrodialysis stack, often referred to as a metathesis-electrodialysis stack, having a repeating cell with four membranes. In still other embodiments, a Donnan dialysis device may be used, an ion-exchange column device may be used or an electrodeionization process may be used. In metathesis electrodeionizaion, ion exchange material is placed between the anion-exchange membrane and cation-exchange membrane of a metathesis-electrodialysis stack in contact with the feed water and provides a conductive path for ions to migrate from the diluate solution.

Figure 2:
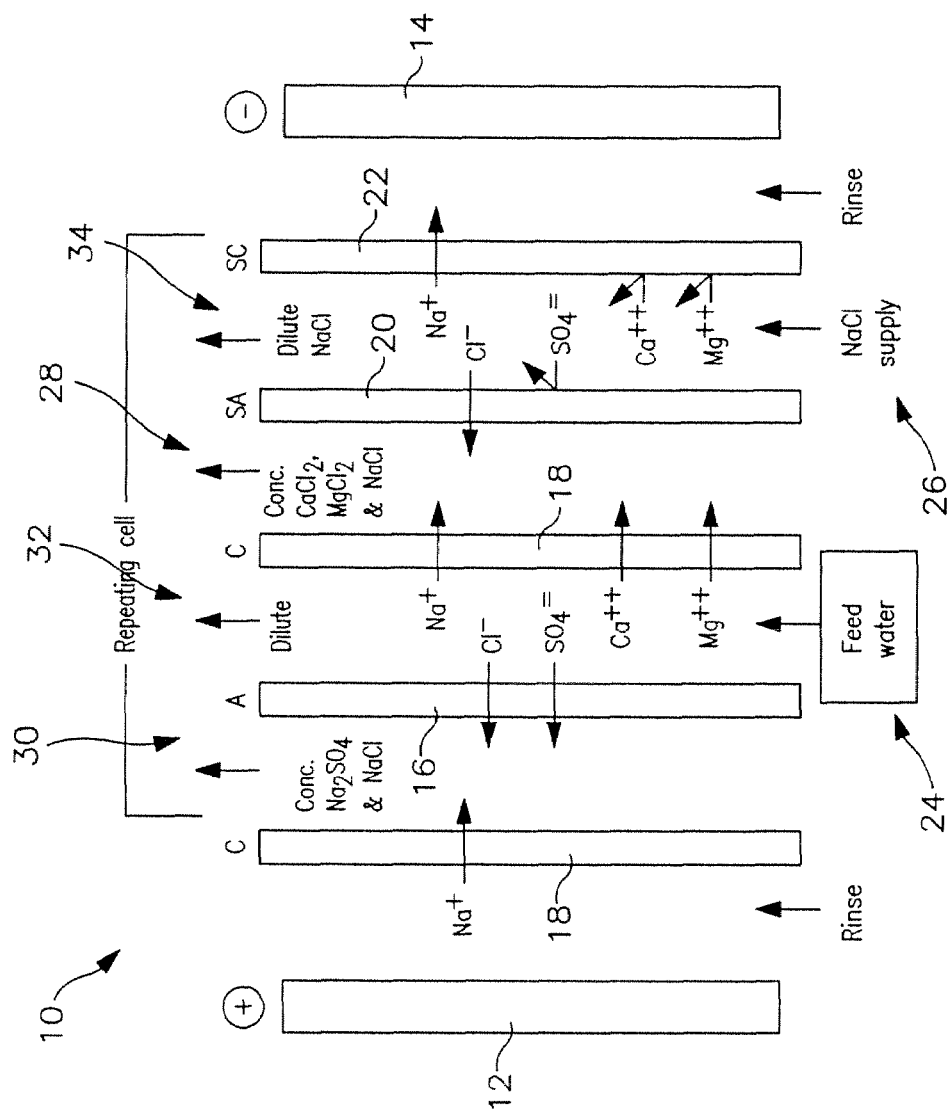
FIG. 2 is a side view of one embodiment of an electrodialysis device that may be used in accordance with the present disclosure.

Referring to FIG. 2, for instance, one embodiment of an electrodialysis device 10 that may be used in accordance with the process of the present disclosure is illustrated. As shown, the electrodialysis device 10 includes a plurality of membranes spaced in between a pair of electrodes 12 and 14. More particularly, the membranes include an anion permeable membrane 16 and a cation permeable membrane 18. As shown, the saline water source containing, in this embodiment, calcium sulfate is fed in between the membranes 16 and 18.

As shown, the exemplary electrodialysis device 10 further includes membranes that are monovalent-ion-selective. In particular, the electrodialysis device includes a monovalent-anion-selective membrane 20 and a monovalent-cation-selective membrane 22. As shown, the salt supply containing a monovalent salt, such as sodium chloride, is fed in between the membrane 20 and the membrane 22. Monovalent-ion-selective membranes are used as membrane 20 and membrane 22 in case the salt supply is contaminated with divalent ions. The use of monovalent-selective membranes, however, may not be necessary if the solution of monovalent salt is essentially free of divalent ions.

When the electric potential is applied to the electrodes, portions of the anions migrate through the anion-permeable membranes 16 and 20, while portions of the cations migrate through the cation-permeable membranes 18 and 22.

The four membranes 16, 18, 20 and 22 may be considered a single unit cell within the electrodialysis device 10. In one embodiment, the unit cell comprised of the four membranes may repeat within the device. Repeating the unit cell further increases the surface area that is available for anion and cation transport. During operation of the device, an electric potential is applied to the electrodes 12 and 14. When the unit cell is repeated between a single pair of electrodes, the flow of solutions to compartments between the membranes can either be in parallel or in series or in combinations of parallel and series. In parallel flow of the saline water source, stream 24 would be split between two or more depleting compartments each defined by a membrane 16 and a membrane 18. In series flow of the saline water source, a solution stream 32 exiting a solution compartment defined by a membrane 16 and a membrane 18 would enter as stream 24 into another solution compartment defined by a membrane 16 and a membrane 18.

As illustrated in FIG. 2, the electrodialysis device 10 includes two feed streams 24 and 26. Feed stream 24 comprises a saline water source that is to be purified in the process by removing calcium sulfate. The second feed stream 26 comprises a monovalent salt supply, illustrated as sodium chloride solution. The salt contained in the second feed stream 26 is selected to provide ions that, when matched with the ions contained in the divalent salt of the saline water source 24, does not result in a precipitate forming in the concentrating compartments of the electrodialysis device 10.

In the embodiment shown in FIG. 2, the second feed stream 26 contains sodium chloride. It should be understood, however, that various other salts may be contained in the second feed stream. The monovalent ions in the second feed stream may be from salts added to the process and they may be derived from monovalent ions present in the saline feed water. For instance, the second salt stream 26 may contain a dissolved salt, NX, that contains a cation, N, and an anion, X. In the case where the sparingly soluble salt in the saline feed water is calcium sulfate, N is representative of cations that form sulfate salts that are substantially water-soluble and may comprise lithium, sodium, potassium, cesium, rubidium, ammonium, an amine, or any other suitable cation. X is representative of anions that form calcium salts that are substantially water-soluble and may comprise chloride, bromide, iodide, nitrate, an organic ion, and the like.

As described above, in one particular embodiment, the monovalent ions in the second feed stream 26 may be derived from the saline feed water 24. In fact, significant efficiencies are achieved if the second salt stream is derived from the feed supply. Of particular advantage, the second salt stream 26 may be derived from the feed supply even when the dissolved salt NX is present in the feed supply at a relatively low concentration, such as in relation to the concentration of MY (such as calcium sulfate) in the feed supply 24. In particular, because the salt in the second feed stream may be utilized over and over, the feed supply 24 may be used to produce the second salt stream even when the salt is in a relatively low concentration.

In general, the second salt stream 26 may be derived from the feed supply 24 in any suitable manner as would be apparent to one skilled in the art. For example, in one embodiment, a portion of the feed supply may be diverted to form the second salt stream. Alternatively, at least a portion of the feed supply may first be passed through a desalination device capable of removing the salt from the feed supply that is to make up the second salt stream. For instance, in one embodiment, the feed supply 24 may be fed to a nanofiltration device followed by a reverse osmosis device in order to produce the second salt stream containing a dissolved salt, such as sodium chloride. By using a desalination device, the salt concentration, such as the sodium chloride concentration may be increased to a sufficient level for use in the electrodialysis device as shown in FIG. 1.

The concentration of the salt in the second feed stream may vary depending upon the particular application and the desired results. For example, the concentration of the salt in the second feed stream may be substantially matched with the concentration of the low solubility salt in the feed stream 24. For exemplary purposes only, for instance, the concentration of the salt contained in the second feed stream 26 may be from about 0.01 eq/l to about 5.5 eq/l, such as from about 3.5 eq/l to about 4.0 eq/l.

The electrodialysis device 10, due to the arrangement of membranes, causes ions from the salts or electrolytes in the two streams 24 and 26 to change partners. Specifically, in the embodiments shown in FIG. 2, the saline water source 24 contains calcium and sulfate ions, while the second feed stream 26 contains sodium and chloride ions. When fed through the electrodialysis device 10, a first salt stream 28 is produced containing calcium chloride and a second salt stream 30 is produced containing sodium sulfate. As shown, for instance, calcium ions migrate through the cation-permeable membrane 18, while chloride ions migrate through the monovalent-anion-selective membrane 20 to form the calcium chloride solution 28. Similarly, sulfate ions migrate through the anion-permeable membrane 16, while sodium cations migrate through the monovalent-cation-selective membrane 22 to form the sodium sulfate stream 30.

Of particular advantage, calcium chloride and sodium sulfate are much more soluble in water than calcium sulfate contained in the saline water source 24. Since the sodium sulfate and the calcium chloride solutions have relatively high solubility in water, these salts can then be concentrated appreciably by recirculating the solutions through the electrodialysis device 10 if desired.

For instance, the concentration of calcium in the salt stream 28 and the concentration of sulfate in the salt stream 30 may be much greater than the concentration of calcium and sulfate in the feed supply 24. In one embodiment, for example, the concentration of calcium in the salt stream 28 and/or the concentration of sulfate in the salt stream 30 may be twice the concentration of calcium and/or sulfate in the feed supply 24, such as three times the concentration, such as four times the concentration, or, in one embodiment, even five times the concentration.

As described above, calcium chloride and sodium sulfate are relatively soluble in water, especially in relation to calcium sulfate.

Figure 4:
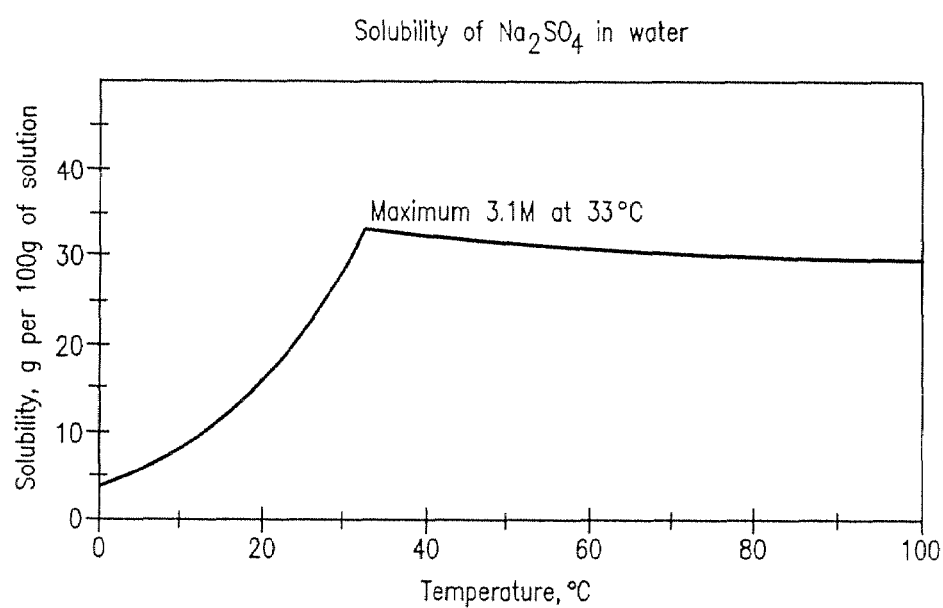
FIG. 4 is a graphical representation illustrating the solubility of sodium sulfate in water.

For example, the solubility of sodium sulfate in water is illustrated in FIG. 4. As shown, in the temperature range of 0-33° C., the water solubility increases dramatically as temperature is increased. The solubility of sodium sulfate is reported to be about 50 g/100 ml of water at 33° C. and 4.76 g/100 ml of water at 0° C. The solubility of calcium chloride is 159 g/100 mL of water at 0° C. and 59.5 g/100 mL of water at 100° C. The above solubilities can be compared to calcium sulfate which, at 30° C., has a solubility of only 0.209 g/100 mL of water.

As described above, in an alternative embodiment, the electrodialysis device 10 may comprise metathesis electrodeionization. In metathesis electrodeionization, the compartments in the device 10 contain ion-exchange material. The ion-exchange filler in the compartments may be a mixture of anion-exchange and cation-exchange beads although a single type of resin may be present. Further, the ion-exchange filler may be in the form of fibers, fabric, foam and the like.

Figure 6:
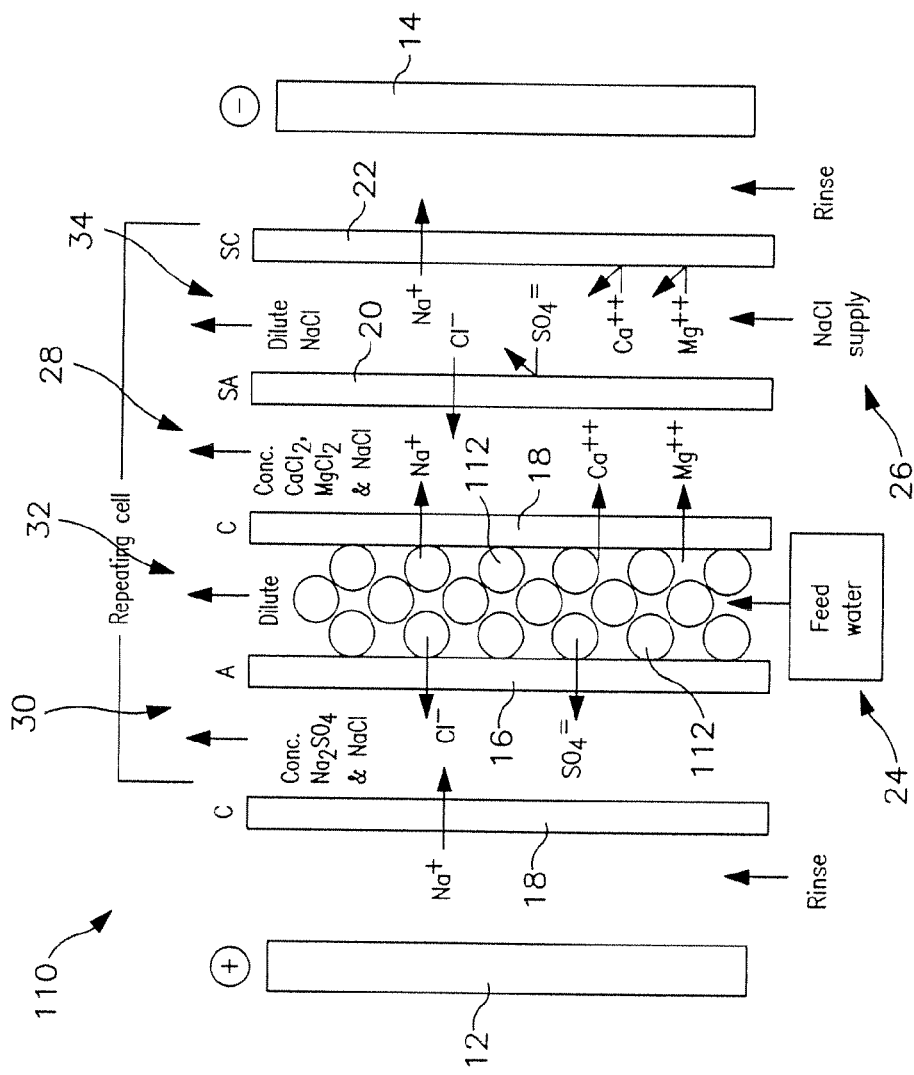
FIG. 6 is a side view of one embodiment of a metathesis electrodeionization device that may be used in accordance with the present disclosure.

Referring to FIG. 6, for example, a metathesis electrodeionization device 110 is shown. Similar to FIG. 2, like reference numerals have been used in order to show similar elements. In the metathesis electrodeionization device 110, feed water 24 is fed in between the ion permeable membranes 16 and 18. In addition, the metathesis electrodeionization device 110 further contains ion-exchange material 112 positioned in between the membrane 16 and the membrane 18. As described above, the ion-exchange material 112 may comprise a mixture of anion-exchange and cation-exchange beads. The ion-exchange material 112 maintains conductivity between the membranes 16 and 18 and between the electrodes 12 and 14 to allow greater amounts of anions and cations to be separated from the feed water 24.

The saline water source 24 as shown in FIG. 2 may come from various sources. For example, in one embodiment, the saline water source 24 is obtained directly from a feed water without any preconcentration. In this embodiment, the electrodialysis device 10 may comprise the only process used during desalination of the water source.

In other embodiments, however, the process may be practiced in a hybrid process with another desalination device to assist in the maintenance of a high concentration of the ions that are to be removed by the electrodialysis device 10. The other desalination device may comprise a pressure-driven membrane device such as a reverse osmosis or nanofiltration, a chemically driven device such as ion exchange or Donnan dialysis, or an electrically driven device such as electrodialysis or electrodeionization, or combinations thereof. For example, in one embodiment, one or more of the product streams exiting the electrodialysis device 10 as shown in FIG. 1 may be fed to another desalination device in order to produce water suitable for human or animal consumption.

In an alternative embodiment, the water source comprises a byproduct stream obtained from a reverse osmosis process. The reverse osmosis process may be used to produce potable water while also producing the saline water source 24. A process of the present disclosure may then be used to treat the saline water source to produce further amounts of potable water and to obtain useful byproducts.

In still an alternative embodiment, the saline water source 24 may be split between the feed streams of both the reverse osmosis process or other desalination device such as nanofiltration and the electrodialysis process.

As shown in FIG. 2, once the saline water source 24 passes through the electrodialysis device 10, a product stream or diluate stream 32 is produced. Depending upon the particular application, the diluate stream 32 may be rendered potable or may need further processing. In other embodiments, the diluate stream may be sufficiently clean so as to be discharged back to a natural feed water.

In one embodiment, all or a portion of the diluate stream 32 may be fed to a desalination device to produce a purified water stream. For instance, all or a portion of the diluate stream 32 may be fed to a nanofiltration device or a reverse osmosis device for producing a purified water stream and a salt stream. The salt stream may be fed back to the feed supply 24 if desired.

As described above, in one embodiment, the saline water source 24 may comprise a byproduct stream obtained from a reverse osmosis process. If desired, in this embodiment, all or a portion of the diluate stream 32 may be recycled back to the reverse osmosis process or fed through another reverse osmosis process. Thus, the effective yield of potable water is increased. The electrodialysis device 10 can be designed to operate at substantially the same pressure as the reverse osmosis process to avoid the expense of repressurizing the diluate stream 32 prior to recycle. If the total volume of the diluate stream 32 were to be recycled to a reverse osmosis feed, in certain applications, a possibility may exist for buildup of the concentration of materials that are not removed by the electrodialysis process. If desired, an appropriate amount of this solution can be purged to control such a buildup.

When it is desired to use the process of the present disclosure in order to produce further amounts of purified water, the increased recovery of purified water may be significant. For instance, greater than about 67%, such as greater than about 80%, such as greater than about 90%, such as greater than about 95%, and, in one embodiment, such as greater than about 98% of the water contained in the feed supply 24 may be recovered as purified water through the process. The above recoveries are possible even if the feed supply 24 is saturated by the low solubility salt in amounts greater than 50%, 70%, 80%, or even 90% of saturation.

As also illustrated in FIG. 2, the sodium chloride supply 26 also forms a diluate stream 34. Similarly, all or a portion of the diluate stream 34 can be fed and recycled to a reverse osmosis feed stream, and an appropriate portion can be purged. Depending upon the concentration of ions in the diluate stream 34, the stream can also be recycled back through the electrodialysis device 10 for supplying further sodium and chloride ions to the process.

In one embodiment, all or a portion of the diluate stream 34 may be fed to any suitable desalination process in order to produce a purified water stream and a more concentrated salt stream containing, for instance, sodium and chloride ions. The concentrated salt stream may then be recycled to use as the salt supply 26 for the electrodialysis device 10. In this manner, greater amounts of purified water are recovered during the process.

As illustrated in FIG. 2, the saline water source 24 and the sodium chloride supply 26 may include further dissolved salts depending upon the particular application. For instance, the saline water source 24 may include dissolved sodium chloride. The process can be designed to remove an appreciable portion of the ions as they pass through the electrodialysis cell. In other embodiments, the ions may remain in the product stream and not interfere with the end use of the resulting water, or the product stream may be fed to further processes for their removal.

In one embodiment, the saline water source 24 may include various ions, such as magnesium, selenate, arsenate, and the like. In general, these ions can be removed from the saline water source by migration through the cation permeable membrane 18 or the anion-permeable membrane 16. Thus, the magnesium cations can migrate to the first salt stream 28 and the selenate and arsenate anions can migrate to the second salt stream 30. As will be described in greater detail below, these ions can be removed in a manner that forms a useful product.

Similarly, the sodium chloride supply may also include divalent ions, depending upon the origination of the sodium chloride solution. The use of monovalent-selective membranes reduces the undesired migration of the divalent ions into the concentrating compartments. If a relatively pure sodium chloride solution is used as the sodium chloride supply 26, monovalent-ion-selectivity may not be a necessary property of membranes 20 and 22.

Referring to FIG. 1, one embodiment of a process incorporating the electrodialysis device 10 of FIG. 2 is illustrated. As shown, the saline water source 24 and the sodium chloride supply 26 are fed to the electrodialysis device 10 to form a product stream 32 and a diluate sodium chloride stream 34. A first salt stream 28 containing calcium chloride and a second salt stream 30 containing sodium sulfate are also formed within the electrodialysis device 10. In the embodiment shown in FIG. 1, the product stream 32 is recirculated through the electrodialysis device 10 and portions are withdrawn as the product stream is combined with the saline water source. Similarly, the sodium chloride output stream 34 can also be circulated to the sodium chloride supply 26 with a portion diverted to the feed supply 24.

The product stream 32 and the diluate sodium chloride stream 34 can be recirculated to achieve desired reduction in salt concentration. In large-scale operations, the path length in the electrodialysis device 10 can be sufficient for the desired reduction to take place in a single pass between the membranes.

Treatment of the first salt stream 28 and the second salt stream 30 will now be described in greater detail. As shown in FIG. 1, the first salt stream 28 contains calcium chloride and possibly other components, such as dissolved sodium chloride and magnesium chloride. The second salt stream 30, on the other hand, contains sodium sulfate and possibly other dissolved salts such as sodium chloride. Calcium chloride is very soluble in water even at low temperature. Sodium sulfate, on the other hand, although much more soluble in water than calcium sulfate, has a lower solubility at lower temperatures as particularly shown in FIG. 4. For instance, if the operating temperature of the electrodialysis device drops too much, the sodium sulfate can crystallize in the device. Operating the electrodialysis device close to 33° C., however, allows for a relatively high concentration of dissolved sodium sulfate in water.

In one embodiment of this invention the solutions rich in the sodium sulfate and calcium chloride can be conveyed separately to a site for disposal or for recovery of valuable constituents. A supply of sodium chloride (or an appropriate salt comprised of monovalent ions that do not form sparingly soluble salts with calcium or sulfate) may be required to feed the compartments between the membranes 20 and 22 as shown in FIG. 2. The operating conditions of the system may be adjusted such that the salinity of the sodium-chloride depleted effluent 34 is close to that of the feed 24, and that effluent solution is combined with the feed 24 or treated separately by reverse osmosis to produce fresh water.

Alternatively, if crystalline salt is used as the source of the sodium chloride supply, sodium chloride crystals and makeup water may be added to a supply tank through which the solution is circulated.

In the arrangement illustrated in FIG. 1, all of the water in the calcium chloride and sodium sulfate streams is derived from transport through the ion-exchange membranes. That water transport includes osmosis, water of hydration of the transported ions, and electro-osmosis. The water transport through a membrane is dependent upon the properties of the membrane and upon the composition of the solution. As a rule of thumb, roughly five molecules of water molecules accompany an ion through the membrane. Thus a pair of monovalent ions would transport about ten water molecules, i.e., ten moles of water (180 g) would be transport per mole of salt. By this logic, a 5.5 molar NaCl solution would experience a volume reduction but no concentration change as it flows through the salt compartment of the device illustrated in FIG. 2. On the other hand, an NaCl solution more dilute than 5.5 molar would experience a reduction in both volume and concentration.

Figure 5:
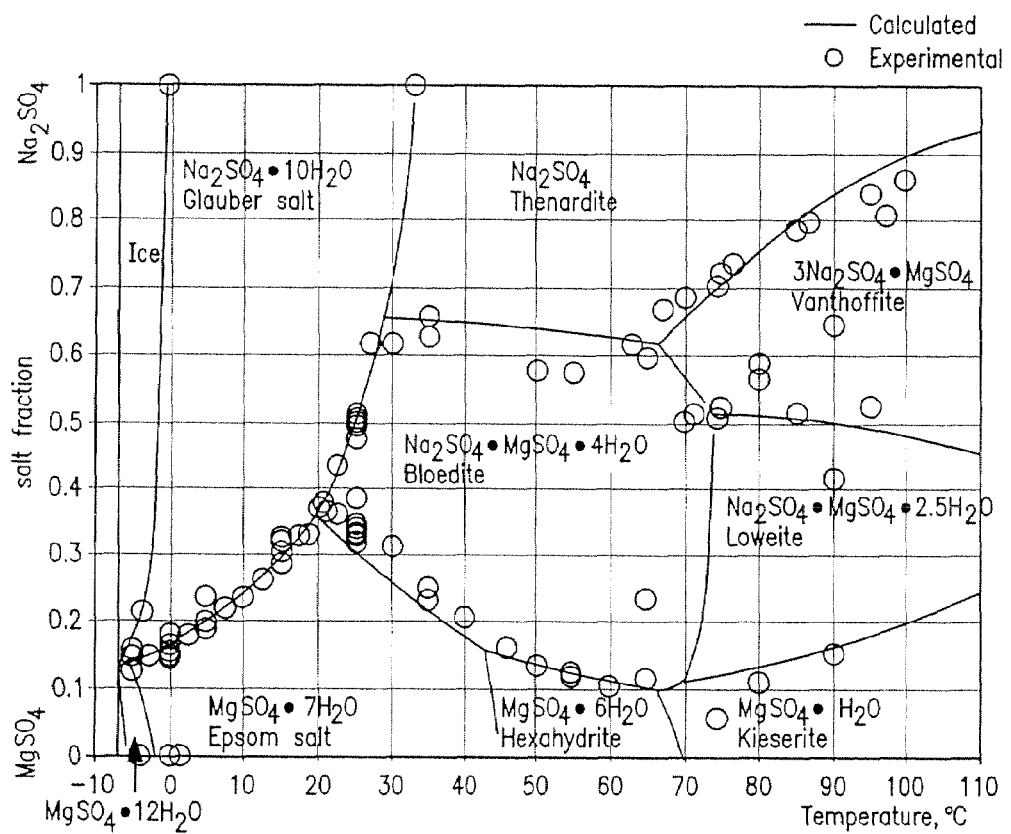
FIG. 5 represents a phase diagram of a sodium sulfate and magnesium sulfate system.

It is recognized that conditions may exist in which the transport of water through the membranes is insufficient to keep the salts in the concentrate compartments, particularly the sodium sulfate, below their solubility limits. In such situations, means for ensuring that solubility limits are not exceeded in the concentrate streams 28 and 30 may include one or a combination of the following:

1. Addition of dilution water. The water could be derived from the permeate of the reverse osmosis process with appropriate treatment, such as softening, to remove undesired ionic species.
2. Elevation of the operating temperature to increase the solubility of the salts. In the case of sodium sulfate, temperature elevation would not substantially exceed about 33° C., which is reported to be the temperature of maximum solubility of sodium sulfate.
3. Removal from the circulating stream a portion of the salt that is prone to precipitation. In the case of sodium sulfate, removal may be achieved by diverting a portion of the stream to a crystallizer 36 as shown in FIG. 1, reducing the temperature of the removed solution to the point where crystals of sodium sulfate form, removing the crystals, warming the supernatant, and returning the warm supernatant to the circulating stream. For example, referring to FIG. 5, a phase diagram of the system sodium sulfate and magnesium sulfate is illustrated. The zones in the figure represent the composition of solid crystals in equilibrium at the temperature shown on the bottom scale with a saturated solution with the properties of the two salts indicated on the left-hand scale. For a pure solution of sodium sulfate, the composition would be that shown at the top of the figure. The figure indicates that a crystal of $Na_2SO_4.10H_2O$ (Glauber salt) will be converted to anhydrous sodium sulfate (Thenardite) when it is heated above about 33° C.
4. Circulating a portion of the sodium sulfate stream to a bipolar electrodialysis (BPED) stack to split the salt into an acid stream and a basic stream. The basic stream would comprise NaOH. The acidic stream would comprise $H_2SO_4$ if the BPED were of the 3-compartment type (A, C, and BP membranes) or $NaHSO_4$ if the BPED were of the 2-compartment type (C and BP membranes). The product streams from the BPED would preferably be used in the pretreatment of feed water containing $Ca(HCO_3)_2$. Addition of NaOH to the feed would cause precipitation of $CaCO_3$, and addition of the acid would neutralize any residual $HCO_3^-$ ions and release $CO_2$.

In one embodiment, as shown in FIG. 1, the first salt stream 28 and the second salt stream 30 after exiting the electrodialysis device 10 are fed to a precipitation chamber 38. Within the precipitation chamber 38, the salt streams are mixed to cause the controlled precipitation of calcium sulfate. The precipitated calcium sulfate 40 can be removed from the precipitation chamber 38 by sedimentation, centrifugation, filtration, or any other commonly used method of removing suspended solids. The calcium sulfate precipitate, once collected, may be shipped and sold as a useful byproduct.

In one embodiment, for example, the precipitation chamber 38 may comprise an upflow solids contact clarifier.

In order to control the precipitation process within the precipitation chamber 38, the concentrations of calcium ions and the flow rate of the first salt stream 28 and concentration of sulfate ions and flow rate of the second salt stream 30 entering the precipitation chamber may be monitored using any suitable devices. In a preferred embodiment, sulfate ion concentration of the supernatant within or overflowing the precipitation chamber may be monitored by an ion chromatograph. With appropriate assumptions about the approach to equilibrium and a suitable control algorithm, the flow rate of each of the salt streams may be controlled in order to control formation of the precipitate. If desired, a portion of the stream that contains the excessive amount of the divalent ions may be diverted also.

Within the precipitation chamber 38, excess sulfate ions may be maintained or excess calcium ions may be maintained depending upon the particular application and the desired results. If an excess of sulfate ions is maintained in the precipitation chamber, the concentration of calcium at equilibrium can be kept low.

If crystallization of sodium sulfate is used to control its concentration in the solution circulating through the electrodialysis device 10, a portion of the crystalline sodium sulfate can be dissolved and added to the precipitation chamber 38 to achieve the stoichiometric requirements of sulfate to precipitate essentially all of the calcium delivered to the precipitation tank. The liquid for dissolution of the sodium sulfate crystals is preferably derived from the supernatant of the precipitation chamber in order to minimize the volume of supernatant solution to be further processed. In some cases no additional liquid is needed for recovery of sodium sulfate solution from the crystals. Under normal conditions the crystals are expected to be $Na_2SO_4.10H_2O$ (Glauber's salt). When heated above about 33° C., the crystals may decompose to form anhydrous sodium sulfate crystals (thenardite) and a saturated solution of sodium sulfate. That saturated solution can be added to the precipitation chamber to augment the concentration of the solution therein to the stoichiometric requirements.

Figure 3:
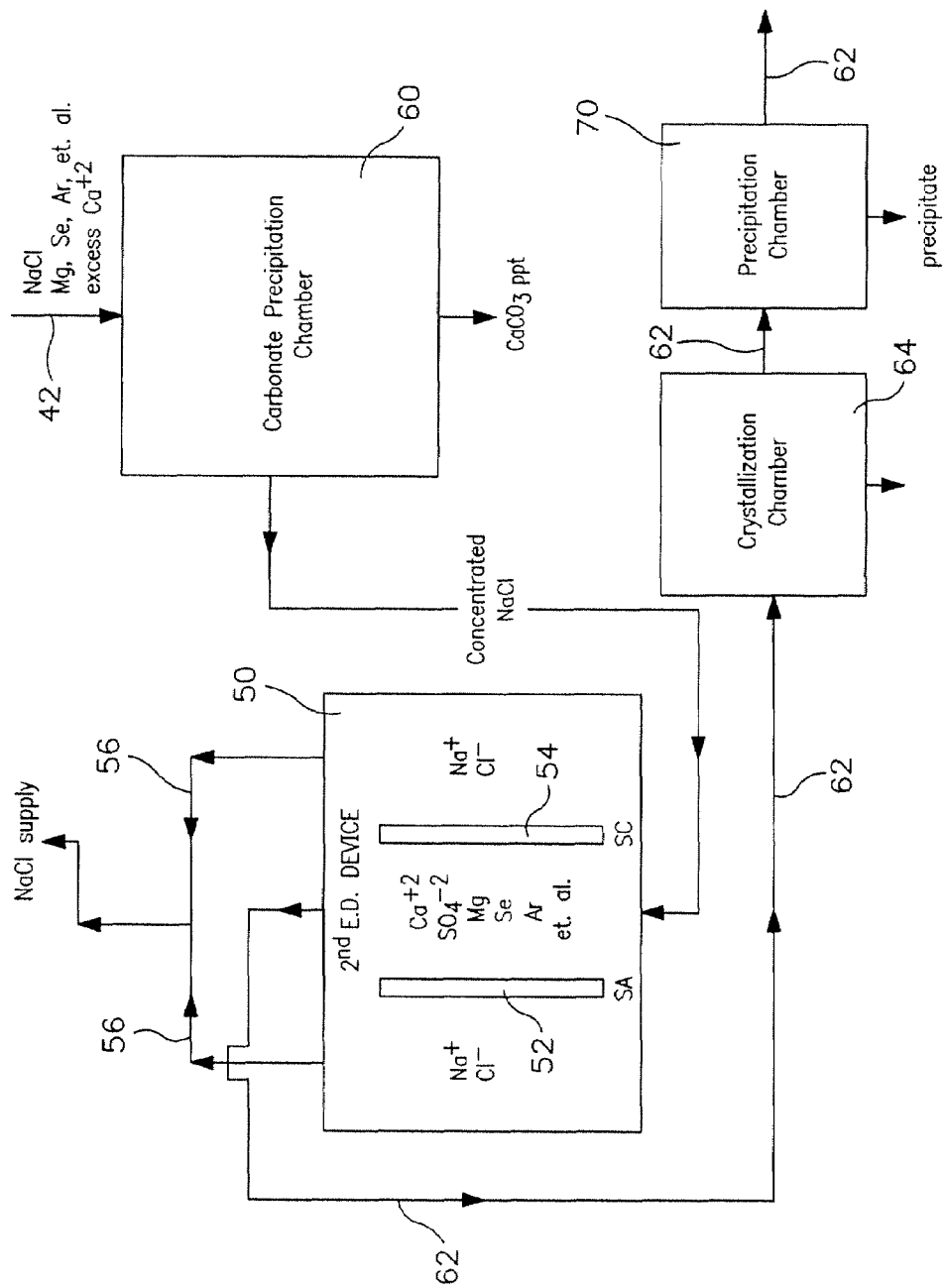
FIG. 3 is a plan view of one embodiment of a process that may be used in conjunction with the process illustrated in FIG. 1.

After precipitation of calcium sulfate in the precipitation chamber 38, a supernatant 42 is formed. The supernatant 42 may undergo further processing as shown in FIG. 3 in order to remove further components as desired.

After precipitation of $CaSO_4$ the supernatant 42 has an appreciable concentration of NaCl and is substantially saturated with $CaSO_4$. In addition, the supernatant 42 may also include various other dissolved components, such as magnesium, selenium, arsenic, and the like. The occurrence of these dissolved components generally depends upon the feed supply 24.

In one embodiment, the supernatant 42 with the $CaSO_4$ precipitate removed is directed to flow through a second electrodialysis device 50. The second electrodialysis device may include, for instance, a monovalent-anion-selective membrane 52 and a monovalent-cation-selective membrane 54 in a repeating arrangement. By feeding the supernatant 42 between the two membranes, the sodium ions and chlorine ions are removed. The concentrate stream 56 exiting the second electrodialysis device 50 thus contains dissolved sodium chloride which may then be fed to the first electrodialysis device 10 as shown in FIG. 1 for supplying dissolved sodium chloride to the metathesis process. As described above, by deriving the sodium chloride supply 26 from the feed supply 24, various efficiencies are obtained.

It is generally known to those skilled in the art that the rejection of sulfate by monovalent-anion-selective membranes is more efficient than the rejection of calcium ions by monovalent-cation-selective membranes. Thus, in one embodiment, conditions within the precipitation chamber 38 may be controlled so that excess sulfate ions are present in the supernatant 42.

In the embodiment shown in FIG. 3, the ion separating device comprises an electrodialysis device 50. It should be understood, however, that various other ion separating devices may be used in the process. For example, in an alternative embodiment, the sodium ions and the chloride ions may be recovered from the supernatant using nanofiltration. In still other embodiments, the supernatant 42 may be fed through a series of ion separating devices. The ion separating devices in the series may comprise similar devices or different devices.

Alternatively or in addition, a beneficial but not essential additional step is to remove residual $Ca^{++}$ ions from the supernatant 42 of the $CaSO_4$ precipitation step. For example, in one embodiment, the supernatant 42 may be fed to a carbonate precipitation chamber 60 in which the excess calcium ions are precipitated as calcium carbonate. More particularly, residual $Ca^{++}$ ions may be removed by addition of a carbonate salt like $Na_2CO_3$ followed by neutralization with acid such as HCl or $H_2SO_4$ and optionally by $CO_2$ removal by any conventional means. If the supernatant 42 contains sufficient $HCO_3^-$ ions, the removal of residual $Ca^{++}$ ions can be accomplished by addition of a base such as NaOH or $Ca(OH)_2$. Benefits of removing residual $Ca^{++}$ ions include increasing the purity of magnesium salts (if present) to be recovered in a subsequent process step and reducing the propensity for precipitation of $CaSO_4$ in the electrodialysis device 10.

Of particular advantage, the calcium carbonate precipitate recovered in the carbonate precipitation chamber 60 can be collected and reused as desired. Calcium carbonate, for instance, may be used in various industrial processes. Precipitated calcium carbonate, for example, is commonly used as a filler in many products, such as paper products.

Once the supernatant stream 42 passes through the carbonate precipitation chamber 60 if present and through the second electrodialysis device 50, a remaining stream 62 is produced. The stream 62 may contain residual amounts of sodium, chloride ions, and possibly various multivalent ions. Multivalent ions that may be present include, for instance, various metal ions, such as magnesium ions. The stream 62 may also contain selenium, arsenic, and various other components depending upon the origination of the feed water source. In one embodiment, these remaining components may be removed from the stream 62 into various usable products.

For example, as shown in FIG. 3, the stream 62 may first be fed to a crystallization chamber 64. The crystallization chamber 64 may be used to crystallize and remove various metal salts such as magnesium salts. For instance, depending upon the components present in the stream 62, magnesium may be crystallized as magnesium sulfate, magnesium chloride, or precipitated as magnesium hydroxide.

For example, in one embodiment, the stream 62 may contain magnesium ions, sulfate ions, and residual amounts of sodium ions and chloride ions.

On a weight basis the solubility of $MgSO_4$ is lower than that of NaCl at 0° C. and substantially higher than that of NaCl at 100° C. Therefore, if the concentration of $MgSO_4$ in the solution is appreciably higher than the NaCl concentration, then $MgSO_4$ can be recovered by crystallization. Any conventional means of recovery of $MgSO_4$ may be utilized. For instance, heat may be supplied at atmospheric or elevated pressure to evaporate water under conditions of high solubility and then to cool the solution by application of a vacuum. Heating and cooling can be done batch-wise in a single vessel or can be carried out in separate vessels. The heating may continue until enough water is removed to raise the NaCl content of the liquid as high as about 80% of its saturation value. Some crystallization of $MgSO_4$ might occur in the boiler. Then the liquid (and $MgSO_4$ crystals if they have formed) is transferred to an evaporation vessel, that may be agitated. With substantial removal of $MgSO_4$ by crystallization, a portion of the NaCl-rich solution may be recycled to boost the NaCl concentration of the feed to the second electrodialysis device 50 or to increase recovery of $MgSO_4$.

Alternatively, if chloride ions are in a greater concentration than sulfate ions, magnesium chloride crystals may be formed in the crystallization chamber 64. Magnesium chloride can be removed, for instance, by evaporation followed by cooling to crystallize the magnesium chloride. Evaporation increases the concentration of sodium chloride and magnesium chloride. The solubility of sodium chloride is not significantly affected by temperature, while the solubility of magnesium chloride is substantially greater at elevated temperature. Cooling, which can be achieved by vacuum evaporation, refrigeration or any other means known to a person skilled in the art, causes the magnesium chloride to crystallize.

The separation method used in the commercial process for recovery of $MgCl_2$ from carnallite brines can also be applied to this process. The brine is evaporated until NaCl and other salts crystallize and the specific gravity of the solution reaches 1.435, which corresponds to a concentration of 47%. Upon cooling that dense solution forms hydrated crystals of $MgCl_2 \cdot 6H_2O$.

In still an alternative embodiment, magnesium may be recovered from the stream 62 as a magnesium hydroxide. In order to form magnesium hydroxide, the stream 62 may be treated with a suitable base.

After treatment in the crystallization chamber 64, the stream may contain other components for removal. For example, the stream may contain various pollutants such as selenium, arsenic and the like. Selenium, for example, is sometimes present in groundwater and surface water in concentrations that make the water unsuitable for human consumption or even for irrigation. Such water sources may be treated in accordance with the present disclosure and the selenium may be removed as a useful byproduct. In particular, the process as shown in FIGS. 1 and 3 allows for removal of sulfate ions separately from water as solid sulfate salts prior to removal of selenium. Selenium, when present, is generally in the form of selenate ($SeO_4^=$).

For instance, as shown in FIG. 3, in one embodiment, the stream 62 may be fed to a precipitation chamber 70 for precipitating a selenate salt.

In one embodiment, for instance, the stream 62 is combined in the precipitation chamber 70 with a soluble salt that causes a selenate to precipitate. For example, barium ions cause precipitation of selenate as barium selenate ($BaSeO_4$), a solid product that can be collected for disposal or use. Barium ions may be added to the stream 62, for instance, in the form of any suitable salt, such as barium chloride. If barium chloride is added in excess, a very low concentration of selenate will remain in solution. On the other hand, less than stoichiometric quantities of barium chloride may be used in order to minimize the return of barium ions in the process if the resulting effluent from the precipitation chamber 70 is recycled to other points in the process.

When precipitating a selenate in the precipitation chamber 70, various techniques can be used to ensure that there are high concentrations of selenate in the stream 62 for the purpose of making the selenium-recovery process more efficient. For example, in one embodiment, a portion of the stream 62 exiting the crystallization chamber 64 may be recycled to an earlier stage in the process. For instance, portions of the stream 62 may be recycled to the calcium sulfate precipitation chamber 38 shown in FIG. 1.

In addition to removing selenate as a precipitate, various other processes may be used to remove selenate from the effluent. For instance, selenate removal may include biological treatment with plants and microbes, ion exchange, electrochemical reduction, reduction with heavy metals in elemental or reduced ionic form, or co-precipitation with metal oxides or hydroxides. Ultimately the selenium may be recovered as a solid by simply evaporating the water from the effluent.

In addition to selenate, various other materials may be similarly removed. For instance, arsenic may be removed using the same or similar techniques.

The present invention may be better understood with reference to the following example.

EXAMPLE

The following is a prophetic example illustrating the use of a system made in accordance with the present disclosure as particularly illustrated in FIGS. 1, 2 and 3. Specifically, the following are estimated calculations using the system and process of the present disclosure in order to desalinate groundwater obtained from the Tularosa Basin in New Mexico.

The ionic composition of real brackish water is unlikely to be just NaCl and $CaSO_4$. An example of real brackish well water is groundwater from the Tularosa Basin in New Mexico. A reported ionic composition of that water is shown in Table 1, first as milligrams per liter, then as milliequivalents per liter.

TABLE 1

Treatment of Tularosa RO reject by Electrodialysis

| | Ion | | | | | | | |
|---|---|---|---|---|---|---|---|---|
| | $HCO_3^-$ | $Cl^-$ | $SO_4^=$ | $Na^+$ | $Mg^{++}$ | $Ca^{++}$ | total | Flow |
| Feedwater analysis, mg/li | 270 | 170 | 1370 | 114 | 163 | 420 | 2507 | |
| Feedwater ions, meq/li | 4.43 | 4.79 | 28.54 | 4.96 | 13.40 | 20.96 | 38 | |
| After lime softening, meq/li | 0.3 | 4.99 | 29.72 | 4.96 | 13.40 | 16.65 | 35 | |
| RO feed neutralized, meq/li | 0 | 4.99 | 30.02 | 4.96 | 13.40 | 16.65 | 35 | 1000 |
| RO permeate, meq/li | | 0.499 | 3.002 | 0.496 | 1.340 | 1.665 | 4 | 600 |
| RO reject, meq/li | | 11.73 | 70.55 | 11.65 | 31.50 | 39.13 | 82 | 400 |
| Metathesis ED diluate, meq/li | | 4.99 | 30.02 | 4.96 | 13.40 | 16.65 | 35 | 395 |
| $Na_2SO_4$-rich ED conc, meq/li | | 570 | 3430 | 4000 | 0 | 0 | 4000 | 5 |
| $CaCl_2$-rich ED conc, meq/li | | 4000 | 0 | 566 | 1532 | 1902 | 4000 | 5 |
| Mixed feed to ppt tank, meq/li | | 2285 | 1715 | 2283 | 766 | 951 | 4000 | 10 |
| Supernatant from ppt tank, meq/li | | 2285 | 771 | 2283 | 766 | 7.52 | 3056 | 10 |
| Selective ED diluate, meq/li | | 570 | 1543 | 595 | 1517 | 1 | 2113 | 5 |
| Purge from MgSO4 recov, meq/li | | 5400 | 2100 | 5637 | 1861 | 3 | 7500 | 0.50 |

A striking feature of this analysis is the high sulfate content as well as high levels of calcium and bicarbonate. Efforts to recover a large portion of purified water by reverse osmosis may result in precipitation of $CaSO_4$ and $CaCO_3$ on the reverse osmosis membranes. The precipitation of $CaCO_3$ can be alleviated by pretreatment, either by acidification with HCl or $H_2SO_4$ to convert the bicarbonate into carbon dioxide or by addition of lime or NaOH to convert bicarbonate to carbonate and precipitate $CaCO_3$. The least expensive pretreatment would be lime addition, so the ionic composition after lime softening is shown. Residual carbonate is neutralized by addition of $H_2SO_4$, which elevates the sulfate slightly. Fortuitously the levels of monovalent anions and cations are almost the same in the pretreated feed solution and remain almost balanced in all the subsequent calculated compositions.

Calculations for the reverse osmosis treatment are based on 60% recovery and on rejection of 90% of all ions. The flow of reverse osmosis feed is shown as 1000 in arbitrary units. The reverse osmosis reject, with a flow of 400, flows between non-selective membranes in an electrodialysis stack (such as shown in FIG. 2) where the flux of ions through the membranes is proportional to their concentration in the solution. The membrane area, path length and electric current in the electrodialysis are chosen such that the total ion content of the diluate from these compartments is equal to that of the reverse osmosis feed, and that solution is recycled to the reverse osmosis feed. Because the ions moving through the membranes carry with them water of hydration, the flow of the diluate is reduced to 395. With this additional source of feed to the reverse osmosis, the flow of pretreated feed water needed is 1000−395=605, and the flow of permeate is still 600. Thus the effective recovery of fresh water is increased to 99%.

The divalent cations, $Ca^{++}$, become associated with Cl— ions that enter the first concentrating compartment through the monovalent-anion-selective membrane SA. For this example it is assumed that the monovalent-anion-selective membrane SA allows no passage of $SO_4^=$ ions. Since the chloride salts of sodium, calcium and magnesium are all highly soluble in water, the concentration in this solution is not solubility-limited. Instead, the concentration is limited by the water of hydration carried by the ions. In this example a concentration of 4000 meq/li (close to the ionic concentration of a 20% solution of NaCl) is chosen. Similarly it is assumed that the monovalent-cation-selective membrane SC allows no passage of divalent cations, so the solution produced in the second set of concentrating compartments is a mixture of NaCl and sodium sulfate. It will be shown below that a very low concentration of $Ca^{++}$ ions will be present in the solution between the membranes, so calcium flux is very low through a cation-selective membrane that is not perfectly selective. The sodium sulfate is highly water-soluble in warm conditions. The composition of the concentrated sodium-salt stream in Table 1 is hypothetical, because it represents a composite that includes the solid $Na_2SO_4 \cdot 10H_2O$ that is removed from the circulating second salt stream of the electrodialysis metathesis as well as the $Na_2SO_4$ that remains in solution.

The two concentrate streams, one rich in $Ca^{++}$ ions and the other rich in $SO_4^=$ ions, flow into a precipitation tank (as shown in FIG. 1) where solid $CaSO_4$ forms. Decantation and/or filtration may be used to separate the solid $CaSO_4$ from the liquid. A $CaSO_4$ solubility product of 1.45 E-3 $(mol/l)^2$ is used to calculate the equilibrium concentrations in the precipitation tank. Since $SO_4^=$ ions are present in great excess, the concentration of $Ca^{++}$ ions is depressed substantially. For feed compositions that contain more calcium than sulfate, a portion of the $CaCl_2$-rich stream may be diverted to waste.

Examination of the composition and flow rate of the supernatant reveals that there is sufficient NaCl present to allow this stream to serve as the "NaCl" supply. However, it is beneficial to further purify the NaCl to avoid excessive concentration of divalent ions in the diluate stream that circulates between the membranes.

Further purification is accomplished in a second electrodialysis stack. The second electrodialysis stack contains monovalent-anion-selective membranes and monovalent-cation-selective membranes. The concentrate stream from the second electrodialysis stack, which is enriched in sodium chloride, is recirculated back to the first electrodialysis stack as the NaCl supply. A small amount of the circulating salt stream in the first electrodialysis stack may be returned to the feed of the second electrodialysis stack to avoid buildup of multivalent ions in the loop.

After passage through the second electrodialysis stack, the filtrate solution loses roughly half of its volume and most of its NaCl. If all of the diluate from the second electrodialysis stack goes to disposal, the flow is only 5 compared to a flow of 400 that would require disposal if the reverse osmosis reject stream had to be discarded. Thus the volume for disposal has been decreased more than 98%.

The diluate from the second electrodialysis stack is a good candidate for further processing, because fortuitously it has almost equal concentrations of $Mg^{++}$ and $SO_4^=$ ions. Evaporation of water from this solution will cause the crystallization of $MgSO_4$, and cooling of a properly evaporated solution to near 0° C. will cause further crystallization of $MgSO_4$ without crystallization of NaCl. If taken to the point of incipient crystallization of NaCl, the final volume would be about $\frac{1}{10}^{th}$ of the volume of the diluate, and 87% of the $MgSO_4$ entering the system would be recovered as crystallized product. A portion of the solution from the crystallizer could be used to boost the NaCl concentration of the feed to the second electrodialysis stack or to increase the yield of $MgSO_4$. Water vapor from the evaporator would be condensed and added to the reverse osmosis permeate to increase the fresh water recovery above 99%.

The small volume of purge solution from the crystallizer would contain essentially all of the NaCl that enters the system, but its high $MgSO_4$ content would limit the value of the salt. Since the volume is small, it could be discarded or evaporated to dryness and sold as road salt. The small purge stream from the diluate stream recycled to the reverse osmosis feed can also be evaporated to achieve zero liquid discharge from the process.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in the following claims.

What is claimed:

1. A process for treating a water stream comprising:
    feeding a water stream through a desalination process to produce a byproduct stream, the byproduct stream containing dissolved calcium ions and sulfate ions;
    contacting the byproduct stream with a cation-removal device and an anion-removal device to remove a substantial portion of the calcium ions and the sulfate ions, the calcium ions passing into a first salt stream, the sulfate ions passing into a second salt stream, the first salt stream containing chlorine ions, the second salt stream containing sodium ions;
    separately feeding the first salt stream and the second salt stream to a calcium sulfate precipitation chamber for precipitating calcium sulfate; and
    collecting the precipitated calcium sulfate.

2. A process as defined in claim 1 wherein the cation-removal device and the anion-removal device are contained in an electrodialysis stack, the cation-removal device and the anion-removal device comprising membranes.

3. A process as defined in claim 1 wherein the first salt stream contains the calcium ions at a concentration that is at least about twice the concentration of calcium ions contained in the byproduct stream and the second salt stream contains sulfate ions at a concentration that is at least about twice the concentration of sulfate ions in the byproduct stream.

4. A process as defined in claim 2 wherein the electrodialysis stack further contains a cation-permeable membrane and an anion-permeable membrane, and wherein the process further comprises the step of feeding an aqueous solution comprising sodium chloride in between the cation-permeable membrane and the anion-permeable membrane for providing chloride ions to the first salt stream and sodium ions to the second salt stream respectively.

5. A process as defined in claim 4 wherein at least a portion of the sodium chloride in the aqueous solution is derived from the original water stream.

6. A process as defined in claim 4 wherein the aqueous solution comprising sodium chloride is completely derived from the original water stream.

7. A process as defined in claim 5 wherein the sodium chloride is derived from the water stream prior to formation of the byproduct stream.

8. A process as defined in claim 5 wherein the sodium chloride derived from the water stream is obtained by passing the water stream or the byproduct stream through a desalination device.

9. A process as defined in claim 4 wherein at least a portion of the sodium chloride contained in the aqueous solution is obtained from a supernatant stream exiting the calcium sulfate precipitation chamber.

10. A process as defined in claim 4 wherein the cation-permeable membrane and the anion-permeable membrane are both monovalent selective.

11. A process as defined in claim 4 wherein the electrodialysis stack comprises repeating cells containing the cation removal device, the anion-removal device, the cation-permeable membrane, and the anion-permeable membrane.

12. A process as defined in claim 11 wherein the byproduct stream is continuously recirculated through the electrodialysis stack while being combined with new amounts of the byproduct stream in order to maintain the supply of calcium ions to the first salt stream and sulfate ions to the second salt stream, and wherein portions of the first salt stream and portions of the second salt stream are diverted to the calcium sulfate precipitation chamber for precipitating the calcium sulfate.

13. A process as defined in claim 1 wherein at least portions of the second salt stream are fed to a sodium sulfate crystallization chamber upstream from the calcium sulfate precipitation chamber, and wherein sodium sulfate is crystallized and collected in the sodium sulfate crystallization chamber thereby producing a supernatant that is recombined with the second salt stream.

14. A process as defined in claim 1 wherein at least one of the sulfate ion concentration or the calcium ion concentration is monitored in the calcium sulfate precipitation chamber and wherein, based upon the monitored concentration, the relative amounts of the first salt stream and the second salt stream being fed to the calcium sulfate precipitation chamber are controlled to maintain excess calcium ions in the chamber.

15. A process as defined in claim 1 wherein the calcium sulfate precipitation chamber produces a supernatant containing sodium ions and chlorine ions and wherein the supernatant from the calcium sulfate precipitation chamber is used to provide chlorine ions and sodium ions for the first salt stream and the second salt stream respectively.

16. A process as defined in claim 1 wherein the calcium sulfate precipitation chamber produces a supernatant containing calcium ions that were not precipitated within the chamber, and wherein the process further comprises the step of combining the supernatant with a carbonate salt to produce a calcium carbonate precipitate.

17. A process as defined in claim 16 wherein the carbonate salt comprises sodium carbonate that, after being combined with the supernatant, is neutralized with an acid after removal of the calcium carbonate precipitate.

18. A process as defined in claim 1 wherein the flow rate of the byproduct stream through the process is at least 50,000 gallons per day.

19. A process as defined in claim 4 wherein the sodium chloride solution contains sodium chloride at a concentration of from about 0.01 eq/l to about 5.5 eq/l.

20. A process as defined in claim 4 wherein the sodium chloride solution contains sodium chloride at a concentration that is not substantially less than a total concentration of ions contained in the byproduct stream.

21. A process as defined in claim 1 wherein the calcium sulfate precipitation chamber produces a supernatant and wherein the supernatant is fed in between a monovalent-cation-permeable membrane and a monovalent-anion-permeable membrane to remove sodium monovalent ions, the remaining supernatant stream containing at least one multivalent metal ion, the supernatant stream being fed to a metal crystallization chamber for crystallizing the metal as a salt.

22. A process as defined in claim 21 wherein the metal comprises magnesium and the magnesium is crystallized either as magnesium sulfate or magnesium chloride.

23. A process as defined in claim 1 wherein the calcium sulfate precipitation chamber produces a supernatant, the supernatant containing ions comprising selenium, the supernatant stream being combined with a salt causing a selenium salt to precipitate.

24. A process as defined in claim 23 wherein the salt combined with the supernatant comprises a barium salt causing barium selenate to precipitate.

25. A process as defined in claim 2 wherein the desalination process to produce the byproduct stream comprises a reverse osmosis device that is maintained at a pressure and wherein the electrodialysis stack is operated at substantially the same pressure.

26. A process as defined in claim 1 wherein at least portions of the second salt stream are fed to a bipolar electrodialysis device for removing sulfate ions from the second salt stream prior to the calcium sulfate precipitation chamber.

27. A process as defined in claim 1 wherein the desalination process comprises a nanofiltration process.

28. A process for purifying water by removing a low soluble salt, MY, from a water stream to prevent the low soluble salt from precipitating within the water stream, the process comprising:
feeding a salt solution containing a dissolved salt, NX, to an ion-removal device for forming a first salt stream containing an anion, X, and a second salt stream containing a cation, N;
feeding the water stream containing the low soluble salt, MY, to an ion-removal device for adding the cation, M, to the first salt stream and for adding the anion, Y, to the second salt stream, the low soluble salt, MY, comprising a divalent salt; and
wherein N comprises $Li^+$, $Na^+$, $K^+$, $Cs^+$, $Rb^+$, $NH_4^+$ or an amine, and wherein X comprises $Cl^-$, $Br^-$, $I^-$, $NO_3^-$ or an organic ion, and wherein both salts NY and MX are more soluble in water than the salts MY.

29. A process as defined in claim 28 wherein M comprises a barium ion or a strontium ion.

30. A process as defined in claim 28 wherein the low soluble salt, MY, comprises calcium sulfate.

31. A process as defined in claim 28 wherein the salt, NX, comprises sodium chloride.

32. A process as defined in claim 28 wherein both the salt solution and the water stream are fed to an electrodialysis stack for separating the anions from the cations.

33. A process as defined in claim 32 wherein the electrodialysis stack produces a product stream containing residual amounts of MY, the product stream being fed to a desalination device for producing a purified water stream and a salt stream, the salt stream being recycled back to the electrodialysis stack and being combined with the water stream that is being fed to the electrodialysis stack.

34. A process as defined in claim 32 wherein the electrodialysis stack comprises a repeating cell including alternately arranged anion permeable membranes and cation permeable membranes.

35. A process as defined in claim 28 wherein the water stream comprises a byproduct stream obtained from a desalination process.

36. A process as defined in claim 35 wherein the desalination process comprises reverse osmosis, nanofiltration, electrodialysis, ion exchange, evaporation, or combinations thereof.

37. A process as defined in claim 35 wherein, after the water stream containing the low soluble salt, MY, passes through the ion-removal device, at least a portion of the water stream is returned to the desalination process.

38. A process as defined in claim 28 further comprising the step of feeding the first salt stream and the second salt stream to a precipitation chamber for precipitating and collecting the low soluble salt, MY.

39. A process as defined in claim 38 wherein the precipitation chamber produces a supernatant and wherein the process further comprises the step of feeding the supernatant through an electrodialysis stack for forming a more concentrated salt solution containing the dissolved salt, NX.

40. A process as defined in claim 39 wherein the more concentrated salt solution is used as the salt solution fed to the ion-removal device for forming the first salt stream and the second salt stream.

41. A process as defined in claim 38 wherein the precipitation chamber produces a supernatant that contains unprecipitated cations, M, and wherein the process further includes the step of combining the supernatant with a salt that causes the cation, M, to form a salt and precipitate.

42. A process as defined in claim 41, wherein the salt that causes the cation, M, to precipitate is a soluble carbonate.

43. A process as defined in claim 32, wherein the salt solution containing the dissolved salt, NX, is fed in between a cation-permeable membrane and an anion-permeable membrane contained within the electrodialysis stack wherein one or both of the membranes are monovalent selective.

44. A process as defined in claim 38, wherein the precipitation chamber produces a supernatant, the supernatant containing at least one cation selected from the group including magnesium, copper, and cobalt, and wherein the process further comprises the step of feeding the supernatant to a crystallization chamber for crystallizing the cation as a salt.

45. A process as defined in claim 44, wherein the cation comprises magnesium, and magnesium is crystallized as magnesium sulfate or as magnesium chloride.

46. A process as defined in claim 38, wherein the precipitation chamber produces a supernatant, the supernatant containing at least one anion selected from the group consisting of selenate and arsenate and wherein the supernatant is combined with a salt that causes the anion to precipitate as a salt.

47. A process as defined in claim 46, wherein the anion is selenate and the salt that is combined with the supernatant comprises a barium salt and wherein selenium is precipitated as a barium selenate.

48. A process as defined in claim 46, wherein the anion is arsenate and the salt that is combined with the supernatant comprises a zinc salt and wherein arsenate is precipitated as a zinc arsenate.

49. A process as defined in claim 43 wherein the salt solution exits the electrodialysis stack containing residual amounts of the dissolved salt, NX, the salt solution exiting the electrodialysis stack being fed to a desalination device for producing a purified water stream and a salt stream containing the dissolved salt, NX, the salt stream being combined with the salt solution containing the dissolved salt, NX, as it is being fed to the ion-removal device.

50. A process for purifying water by removing a low soluble salt, MY, from a water stream to prevent the low soluble salt from precipitating within the water stream, the process comprising;
feeding the water stream containing the low soluble salt, MY, to an ion-removal device for adding the cation, M, to a first salt stream and for adding the anion, Y, to a second salt stream, the low soluble salt, MY, comprising a divalent salt;
feeding a salt solution containing a dissolved salt, NX, to the ion-removal device for adding the anion, X, to the first salt stream and for adding the cation, N, to the second salt stream, the salt solution being derived from the water stream containing the low soluble salt; and
wherein N comprises $Li^+$, $Na^+$, $K^+$, $Cs^+$, $Rb^+$, $NH_4^+$ or an amine, and wherein X comprises $Cl^-$, $Br^-$, $I^-$, $NO_3^-$ or an organic ion, and wherein both salts NY and MX are more soluble in water than the salt MY.

51. A process as defined in claim 50 wherein the water stream contains the low soluble salt, MY, at a concentration that is higher than the concentration at which the water stream contains the salt, NX.

52. A process as defined in claim 51 wherein the concentration of MY in the water stream is at least about twice the concentration of NX in the water stream.

53. A process as defined in claim 50 wherein the salt solution containing NX is derived from the water stream by feeding the water stream through a desalination device in order to remove the salt, NX.

54. A process as defined in claim 53 wherein the desalination device comprises a nanofiltration device.

55. A process as defined in claim 50 further comprising the step of feeding the water stream exiting the ion-removal device to a desalination device for producing a purified water stream and a salt stream containing MY, the salt stream containing MY being recycled back to the water stream.

56. A process as defined in claim 50 further comprising the step of feeding the salt solution exiting the ion-removal device to a desalination device for producing a purified water stream and a salt stream containing NX, the salt stream containing NX being recycled back to the salt solution.

57. A process as defined in claim 50 wherein MY comprises calcium sulfate and NX comprises sodium chloride.

58. A process as defined in claim 50 wherein the ion-removal device comprises an electrodialysis stack.

59. A process as defined in claim 58 wherein the electrodialysis stack comprises a repeating cell including alternately arranged anion permeable membranes and cation permeable membranes.

60. A process as defined in claim 50 further comprising the step of feeding the first salt stream and the second salt stream to a precipitation chamber for precipitating and collecting the low soluble salt, MY.

61. A process as defined in claim 60 wherein the precipitation chamber produces a supernatant and wherein the process further comprises the step of feeding the supernatant through an electrodialysis stack for forming a more concentrated salt solution containing the dissolved salt, NX.

62. A process as defined in claim 61 wherein the more concentrated salt solution is used as the salt solution fed to the ion-removal device.

63. A process as defined in claim 60 wherein the precipitation chamber produces a supernatant that contains unprecipitated cations, M, and wherein the process further includes the step of combining the supernatant with a salt that causes the cation, M, to form a salt and precipitate.

64. A process as defined in claim 58, wherein the salt solution containing the dissolved salt, NX, is fed in between a cation-permeable membrane and an anion-permeable membrane contained within the electrodialysis stack wherein one or both of the membranes are monovalent selective.

65. A process as defined in claim 60, wherein the precipitation chamber produces a supernatant, the supernatant containing at least one cation selected from the group including magnesium, copper, and cobalt, and wherein the process further comprises the step of feeding the supernatant to a crystallization chamber for crystallizing the cation as a salt.

66. A process as defined in claim 60 wherein the precipitation chamber produces a supernatant, the supernatant containing at least one anion selected from the group consisting of selenate and arsenate and wherein the supernatant is combined with a salt that causes the anion to precipitate as a salt.

67. A process as defined in claim 1, wherein the cation-removal device and the anion-removal device are contained in an electrodeionization device.

68. A process as defined in claim 1, wherein the calcium sulfate precipitation chamber produces a supernatant containing sodium ions and chlorine ions and wherein the supernatant is first fed through a nanofiltration device and the resulting stream is included in the first salt stream and the second salt stream.

69. A process as defined in claim 28, wherein both the salt solution and the water stream are fed to an electrodeionization device for separating the anions from the cations.

70. A process as defined in claim 38, wherein the precipitation chamber produces a supernatant and wherein the process further comprises the step of feeding the supernatant through a nanofiltration device for forming a salt solution containing the dissolved salt, NX.

71. A process as defined in claim 50, wherein the ion-removal device comprises an electrodeionization device.

72. A process as defined in claim 60, wherein the precipitation chamber produces a supernatant and wherein the process further comprises the step of feeding the supernatant through a nanofiltration device for forming a more concentrated salt solution containing the dissolved salt, NX, that is fed to the ion-removal device.

* * * * *